May 1, 1962  A. C. ROBERT  3,032,760
METHOD AND DEVICE FOR ANGULAR MEASUREMENTS
BY MEANS OF MICROWAVES
Filed April 7, 1959  2 Sheets-Sheet 1

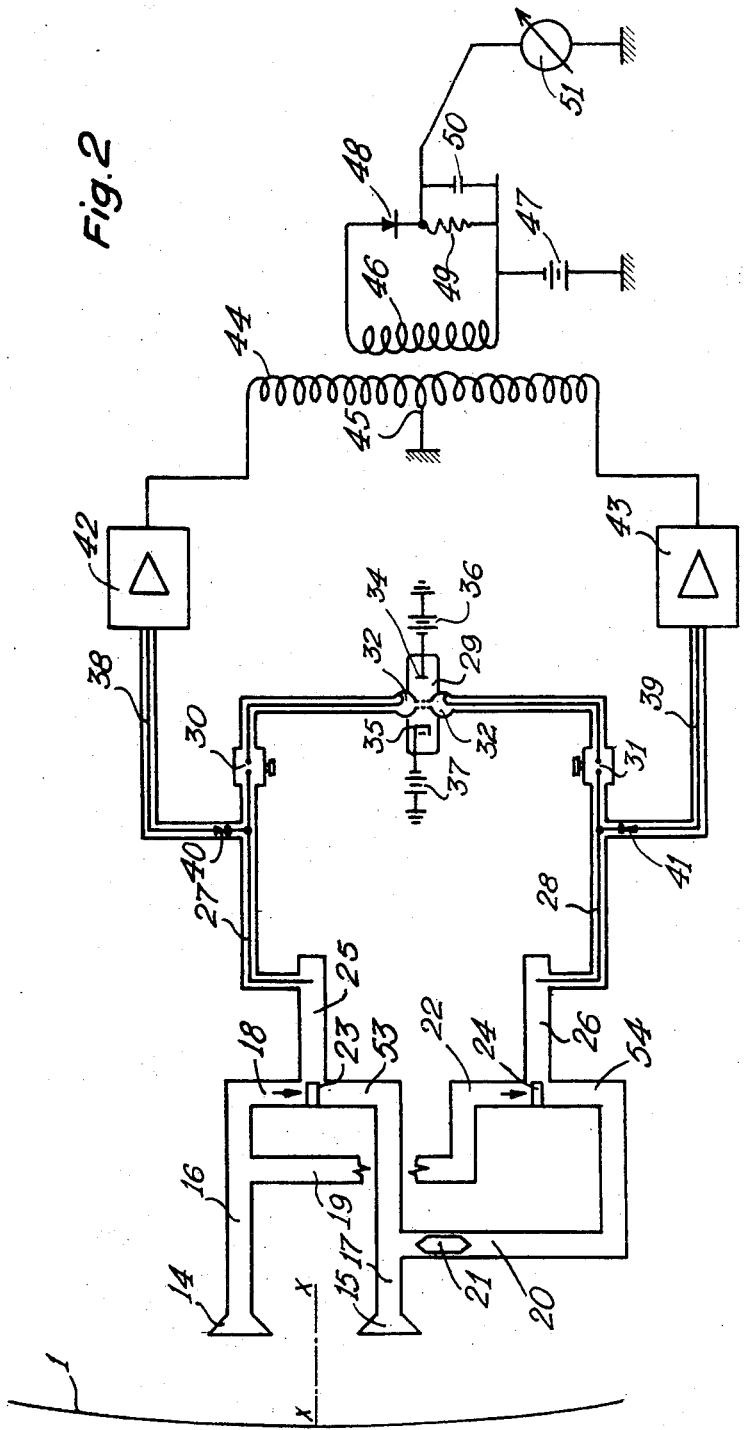

United States Patent Office 3,032,760
Patented May 1, 1962

3,032,760
METHOD AND DEVICE FOR ANGULAR MEASUREMENTS BY MEANS OF MICROWAVES
André Charles Robert, Paris, France, assignor to Sud-Aviation Societe Nationale de Constructions Aeronautiques, Paris, France
Filed Apr. 7, 1959, Ser. No. 804,788
Claims priority, application France Apr. 9, 1958
15 Claims. (Cl. 343—119)

This invention relates to a method of, and device for, effecting angular measurements by means of microwaves or UHF waves, which allows determining, with a degree of rapidity never yet attained, the angle formed between the direction of a microwave beam received by a receiver set and a direction of origin, irrespective of whether the beam is received directly from a transmitter for example, the direction of which it is required to know, or in the form of the reflection of an incident beam striking an aircraft the position of which is desired to ascertain at a given instant.

It is well known that conventional devices used to determine the direction of a microwave transmitter generally comprise a system of directional receiver antennas together with devices allowing continuous displacement of the system's directivity pattern or alternate passage from one pattern to another. The direction sought is obtained by comparing the waves received, with the transmitter placed in different ways in the directivity pattern.

A major drawback of such devices resides in the length of time required to determined angular position, owing to the need to make several measurements and to compare them. This is notably the cause, in forms of radar operation involving fluctuating echo amplitude, for inaccuracies in determining the angular position of the reflecting surface.

To overcome these drawbacks, and in particular to reduce the measuring time to a minimum, the present invention has for its object a method of effecting angular measurements by means of microwaves or UHF waves, whereby, on reception of a microwave, there are created two phased microwaves in two channels symmetrical with respect to at least one of two perpendicular planes passing through the axis of the receiver, these two waves are summed together, one of these waves is summed with the other which has a lag of $\pi/2$ imparted to it, the two out of phase microwave signals obtained by said summations are converted into intermediate frequency signals of identical phase shift, the phase-shift between these two intermediate frequency signals is measured and finally an output voltage is obtained which is proportional to the angle between the direction of the received microwave and that of the symmetry plane of the two channels being used. Preferably the amplitudes of the intermediate frequency signals are limited to equal values before measuring their phase shift.

The invention further has for its object a device for performing the method defined hereinabove, this device comprising a conventional microwave antenna featuring a focusing unit and, in respect of at least one of two perpendicular planes passing through the axis of the unit, two exciters arranged in the vicinity of the focus and symmetrically in relation to this plane, said two exciters being directly connected to a first mixer comprising a detector and, with interposal of a $-\pi/2$ phase shifter on one of them, to a second mixer comprising a detector, these mixers being coupled to a local oscillator and connected to two amplifiers the outputs of which are connected to the input of a phase discriminator. This phase discriminator preferably comprises a center-tapped transformer primary, the secondary being connected to a linear detection circuit fed by a counter-biasing source of current connected to the center-point of said primary.

One of the essential characteristics of this device is that it is capable of furnishing the measurement in an extremely short time which may easily be less than one tenth of a microsecond, for example the duration of a single pulse. Furthermore, the device calls for no modulation whatsoever, be it mechanical or electronic.

Lastly, the invention has for its object industrial applications of the method and device defined hereinabove for effecting angular measurements by means of microwaves, notably in the fields of radar and of aerial warfare against aircraft and missiles.

Other features of the invention will appear from the following description taken in conjunction with the accompanying drawings given by way of example only and not in any limiting sense, and this description will give a clear understanding of how the invention may be performed. In the drawings:

FIG. 2 shows an embodiment of the device schematically illustrated in FIG. 1.

Figure 1:
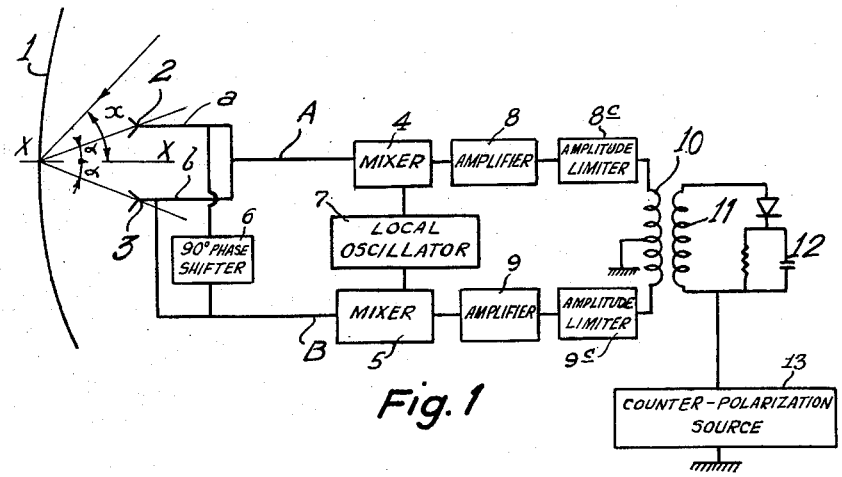
FIG. 1 is a block diagram of a device for effecting angular measurements by means of microwaves according to the invention, to determine angular deviations in a single plane.

The device schematically illustrated in FIG. 1 comprises a conventional microwave antenna having a focusing unit consisting of a parabolic reflector 1 and two exciters 2 and 3 placed near the focal point of the paraboloid, symmetrically in relation to the symmetry axis X—X of said paraboloid and in a horizontal plane passing through this axis. The exciters 2 and 3 are directly connected to a mixer 4. The exciter 3 is additionally connected directly to a second mixer 5 to which the exciter 2 is connected via a $-\pi/2$ phase shifter 6. A local oscillator 7 is coupled to the two mixers 4 and 5 and the output voltages at intermediate frequency are respectively applied to the inputs of two amplifiers 8 and 9 feeding a transformer primary 10. The secondary 11 of this transformer leads into a linear-detection stage 12 fed by an earthed counter-polarization source of current 13 adapted to subtract from the output voltage of the detection stage a constant voltage to be defined presently. The center-point of the primary 10 is likewise earthed.

This being so, if $u$ and $v$ be the dimensions of the reflector 1, $x$ the azimuth of a microwave source being received by the reflector 1, $y$ the elevation of this source and $\lambda$ the wavelength, and if $z_1$ and $z_2$ be made to designate the ratios $$\frac{\pi u}{\lambda} \text{ and } \frac{\pi v}{\lambda}$$

respectively, with the device operating for reception a wave having the form:

$$E_a = k \frac{\sin z_1(\alpha-x)}{z_1(\alpha-x)} \cdot \frac{\sin z_2 y}{z_2 y} \cdot e^{i\omega t}$$

will appear in the channel $a$, $\alpha$ being the angular deviation of each exciter with respect to the axis X—X. Similarly in the channel $b$ will appear a wave having the form:

$$E_b = k \frac{\sin z_1(\alpha+x)}{z_1(\alpha+x)} \cdot \frac{\sin z_2 y}{z_2 y} \cdot e^{i\omega t}$$

These formulae bring out the fact that the two exciters considered are located on either side of the vertical symmetry plane passing through the focal point, and that the line connecting the antenna and the source of emission or reflection forms an angle $x$ with the vertical reference plane and an angle $y$ with the horizontal plane.

These two waves are in phase and $k$ is a proportionality factor which is bound up with the power emitted or reflected, with the antenna gain and with the range.

Now if we let $z_1 \alpha = \pi/2$, which indicates that the maximum of one channel corresponds to the minimum of the other and if $x$ be then assumed to lie between $\pm \alpha$, then, from the preceding formulae, we have:

$$E_a = k \frac{\cos z_1 x}{\pi/2 - z_1 x} \cdot \frac{\sin z_2 y}{z_2 y} \cdot e^{i\omega t}$$

and $$E_b = K \frac{\cos z_1 x}{\pi/2 + z_1 x} \cdot \frac{\sin z_2 y}{z_2 y} \cdot e^{i\omega t}$$

which indicate that the two waves while in phase have an amplitude difference.

If the two waves received are summed in the additive channel A without any phase shifting, a fairly constant expression is obtained in terms of $x$.

Now if the wave $E_b$, and the wave $E_a$ to which a lag of $\pi/2$ relative to wave $E_b$ is imparted, are summed in the additive channel B, a signal is then obtained the amplitude of which is still substantially constant in terms of $x$ and the phase lag $\varphi$ of which relative to the signal in channel A is given by:

$$\tan \varphi = \frac{\pi/2 + z_1 x}{\pi/2 - z_1 x}$$

whence, $$\frac{2z_1}{\pi} x = \tan\left(\varphi - \frac{\pi}{4}\right) \tag{1}$$

This expression gives the value of the angle $x$ in an extremely simple form.

Figure 4:
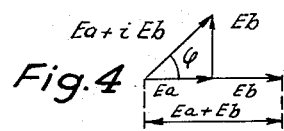
FIGS. 4 and 5 are vector diagrams used in describing the present invention.
Figure 5:
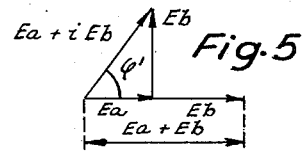

In the channel A the voltage corresponding to wave $E_a$ is added to that corresponding to wave $E_b$ which is in phase with said wave $E_a$; the resultant voltage will be as illustrated by the vector $(E_a + E_b)$ in FIG. 5. In the channel B the voltage corresponding to wave $E_a$ is added to that corresponding to the wave obtained by the phase-shifting of wave $E_b$ through 90°; the resultant voltage will be as illustrated by the vector $(E_a + jE_b)$ in FIG. 4. The phase relation between said resulting voltages is indicated by the angle $\varphi$ in FIG. 4. Assuming, however, as in the vector diagram of FIG. 5 that the voltage corresponding to wave $E_b$ is greater than in the case of FIG. 4, the angle $\varphi$ will change and as can be seen from FIG. 5 a phase angle $\varphi'$ will be obtained which is larger than $\varphi$.

The two UHF signals formed in channels A and B are submitted to a change in frequency under the action of the common local oscillator 7, with a view to obtain IF signals, which change maintains between said IF signals the difference in phase $\varphi$ existing between the previous UHF signals. The output signals from mixers 4 and 5 are amplified at intermediate frequency and limited to two equal values by the separate amplifiers 8 and 9 associated, as well known in this case, with conventional amplitude limiters 8c and 9c.

It should be noted that the gains of these amplifiers need not be equal, there being a peak-clipping and an ultimate limiting process, followed by a sinusoidal regeneration, which serve to equalize the output voltages of the two amplifiers.

The two signals thus obtained are of equal amplitude and out of phase by $\varphi$; they may be written as follows:

$$V_a = e \cos \Omega t$$
$$V_b = e \cos (\Omega t - \varphi)$$

To find the angle $x$ to be measured, conventional quadratic detection devices could be used. Such devices, however, are somewhat heavy and complex, and the angle $x$ can be obtained in a simpler way and with sufficient approximation by determining the difference between the two voltages $V_b$ and $V_a$ by means of the transformer the primary 10 of which has a center tap.

Thus, $$V_b - V_a = -2e \sin\left(\Omega t - \frac{\varphi}{2}\right) \sin \frac{\varphi}{2}$$

Following a linear detection in the device 12, the output voltage V of said detection device is given by $$V = K \sin \frac{\varphi}{2}$$

where K is a proportionality constant.

Now when $\varphi$ lies between $$\frac{\pi}{8} \text{ and } \frac{3\pi}{8}$$

Formula 1 can be rewritten under the very closely approximate form:

$$\frac{2z_1}{\pi} x = 2\left(\sin \frac{\varphi}{2} - \sin \frac{\pi}{8}\right)$$

whence $x$ can be very easily found by energizing device 12 by means of the counter-polarization source of current 13 the voltage of which is equal to $$-K \sin \frac{\pi}{8}$$

so that the algebraical value of the phase shifting is given by said output voltage V of the detection device from which is subtracted said constant voltage $$-K \sin \frac{\pi}{8}$$

The value of $x$ is then proportional to the output voltage of the device 12.

It should be noted that a precise knowledge of $x$ outside of the interval included between $$\frac{\pi}{8} \text{ and } \frac{3\pi}{8}$$

is generally of little importance since measurements are ordinarily made around $x = 0$, i.e.

$$\varphi = \frac{\pi}{4}$$

However, the thus obtained value of $x$ is only very close to the real value, and if greater accuracy is desired for this value then recourse must be had to conventional devices.

In the embodiment illustrated in FIG. 2, the device for measuring angular deviations in a plane comprises two horns 14 and 15 placed in the vicinity of the focal point of the antenna focusing unit formed by a parabolic reflector 1, symmetrically on either side of the symmetry axis X—X of said reflector. These horns are connected to two waveguides 16 and 17 which are connected to the two input waveguides 18 and 53 of a device adapted to direct through a single channel waves propagating through two different channels, such as a matched magic-Tee 23. In addition, two waveguides 19 and 20 are connected to the waveguides 16 and 17. Within the waveguide 20 is located a $-\pi/2$ phase shifter 21 consisting, for example, of a dielectric blade. The two waveguides 19 and 20 are connected to the two input waveguides 22 and 54 of a further matched magic-Tee 24. The waveguides 19 and 20 have a length equal to a whole number of times the wavelength, so as to avoid introducing further phase shifting between the waves travelling in the waveguides 18 and 22. The output waveguides 25 and 26 of the two magic-Tees 23 and 24 are coupled to two coaxial cables 27 and 28.

These coaxial cables 27 and 28 are symmetrically connected to a local oscillator 29 via variable attenuators 30 and 31 which allow adjustment of the ultra-high frequency coupling with the oscillator. A klystron is preferably used as the oscillator. The coaxial cables 27 and 28 terminate into the cavity 32 of said klystron and its reflector 34 and cathode 35 are fed by two earthed sources 36 and 37.

To the coaxial cables 27 and 28 are connected two coaxial cables 38 and 39 in which are interposed detector-crystal mixers 40 and 41 transmitting an intermediate-frequency wave to two separate amplifiers 42 and 43 with amplitude limiting means and then to the primary 44 of a transformer, the center-point 45 of said primary being earthed. The secondary 46 of this transformer is fed by a counter-polarization source of current 47 the voltage of which is equal to $$-K \sin \frac{\pi}{8}$$

the function of which is similar to that of source 13 in FIG. 1. A linear-detector device connected to the secondary 46 and comprising a detector crystal 48 in combination with a resistor 49 and a condenser 50 is connected to a voltmeter calibrated in angle readings. This voltmeter thus gives a reading of the azimuth if the plane of the diagram is the horizontal plane or of the elevation if the plane of the diagram is the vertical plane.

Figure 3:
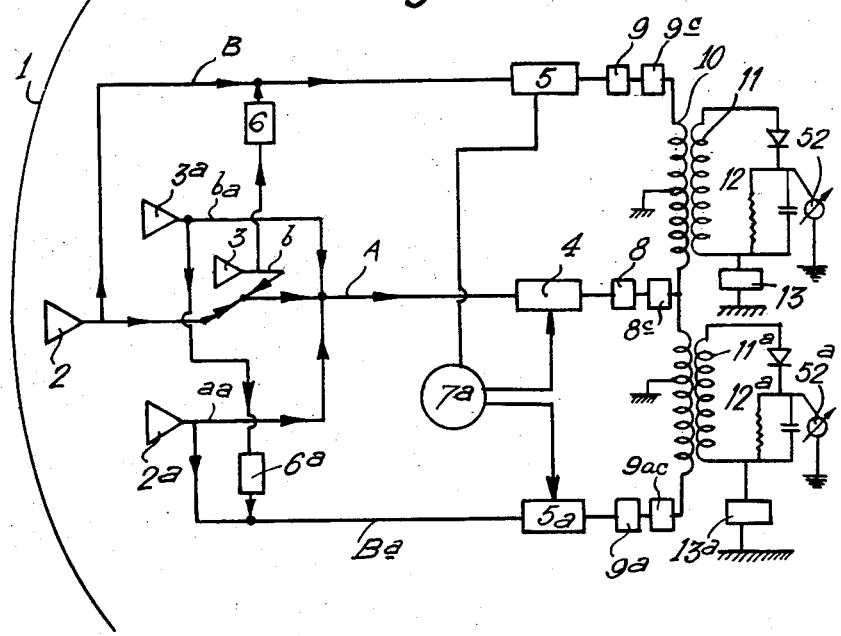
FIG. 3 is a block diagram of a device for effecting angular measurements by means of microwaves according to the invention, determine angular deviations in relation to two perpendicular planes.

In practice, it will be required to measure the angle of incidence of a wave emitted or reflected from a point whose azimuth and elevation it is desired to know. To this end, and as shown in FIG. 3, use is made of two pairs of exciters, one of which (2, 3) is arranged in the horizontal plane passing through the symmetry axis of the antenna focusing unit formed by a parabolic reflector 16 while the other (2a, 3a) is arranged in the vertical symmetry plane of this reflector, each pair being located symmetrically in relation to the symmetry axis defined by these two planes. The exciters 2 and 3 feed the channels $a$ and $b$ followed by the channels A and B, the $-\pi/2$ phase shifter 6 being shunt-fed from exciter 3.

The exciters 2a and 3a feed the channels $aa$ and $ba$ followed by the channels A and Ba, the $-\pi/2$ outphaser 6a being shunt-fed from exciter 3a.

The channels A, B and Ba lead up to three detector-crystal type mixers 4, 5 and 5a coupled to a common local oscillator 7a. The mixers are connected respectively to amplifiers 8; 9 and 9a associated with amplitude limiters 8c, 9c and 9ac.

The amplifiers 8 and 9 feed the primary 10 of a transformer the center point of which is earthed. The secondary 11 of this transformer leads into a linear-detection stage 12 fed by a counter-polarization source of current 13 the voltage of which is equal to $$-K \sin \frac{\pi}{8}$$

this source being earthed. The detector is connected to a voltmeter 52 which gives the azimuth reading.

Similarly, the amplifiers 8 and 9a feed the primary 10a of a transformer the center point of which is earthed. The secondary 11a of this transformer leads into a detection stage 12a fed by a counter-polarization source of current 13a the voltage of which is equal to $$-K' \sin \frac{\pi}{8}$$

this source being earthed. The detector is connected to a voltmeter 52a which gives the elevation angle. Sources 13 and 13a act as the source 13 of FIG. 1.

As stated precedingly, the device for angular measurements according to the invention calls for but a very short measurement time, which eliminates, firstly, virtually all outdated information and, secondly, errors in the determination of angles arising from glittering of the source. The device is extremely simple, since it requires only uncomplicated component elements and calls neither for auxiliary modulation nor for amplifiers having rigorously equal gain characteristics. In addition, a simple modification of the exciters and their circuits will make it a simple matter to mount such a device on current radars.

Obviously, many modifications can be made to the method and manner of performing it described hereinbefore, without departing from the scope of the invention as defined in the appended claims. In particular, to obtain a greater degree of approximation, the voltages Vb and Va could be summed instead of being subtracted from each other. Likewise, the phase-shift could be obtained by imparting to waveguide 20 a length equal to an odd number of quarter-wavelengths while omitting any phase shifter. Lastly, the measurement could be obtained for any system of two perpendicular planes passing through the symmetry axis of the reflector.

What I claim is:

1. A method of effecting angular measurements by means of microwaves, which consists in creating, on reception of a microwave, two phased microwaves with an amplitude difference in two channels symmetrically disposed with respect to a plane passing through the axis of the receiver, summing said two phase microwaves together, phase shifting one of said microwaves in order to impart it a lag of $\pi/2$ with respect to the other microwave, summing said other microwave and said phase shifted microwave, converting the two phase shifted microwave signals thus obtained by the two summations into intermediate-frequency signals of identical phase shift, and measuring the phase-shift between said two phase shifted intermediate-frequency signals, whereby an output voltage is obtained which is proportional to the angle between the direction of the received microwave and that of said plane.

2. A device for effecting angular measurements by means of microwaves, comprising a conventional microwave antenna having a focusing unit, and, for at least one of two perpendicular planes passing through the axis of said focusing unit, a pair of microwave exciters arranged in the vicinity of the unit focus, and, for each pair of exciters, a first mixer having a detector and directly connected to said exciters, a $-\pi/2$ phase shifter connected to one of said exciters, a second mixer having a detector and connected to said phase shifter and to the other exciter, a local oscillator connected to said two mixers for coupling them so that their output voltages are at an intermediate frequency, a pair of intermediate-frequency amplifiers respectively connected to said mixers, and a phase discriminator connected to the output of said amplifiers.

3. A device according to claim 2, wherein the phase discriminator comprises a transformer having a center-tapped primary and a secondary, a linear detection circuit connected to said secondary, and a counter-polarization source of current the ends of which are respectively connected to said detection circuit and to the center tap of the primary.

4. Device according to claim 2, wherein the amplitudes of the amplified intermediate-frequency signals are limited to equal values.

5. Device according to claim 2, wherein a voltmeter calibrated in angle readings is connected to the output of each phase discriminator.

6. Device according to claim 2, wherein the local oscillator consists of a klystron.

7. Device according to claim 2, wherein each exciter comprises a horn connected to a waveguide.

8. Device according to claim 7, wherein each phase shifter consists of a dielectric blade disposed in the corresponding waveguide.

9. Device according to claim 7, wherein the $-\pi/2$ phase shifter is suppressed and wherein one of the waveguides of each pair of exciters has a length equal to a whole number of wavelengths while the other has a length equal to an odd number of quarter wavelengths, whereby at the end of said last waveguide the phase shifting of $-\pi/2$ is obtained.

10. Device according to claim 7, wherein two devices adapted to direct through a single channel two waves propagating through two different channels, such as matched magic-Tees, respectively connect the exciters of each pair and the corresponding mixers, said directing devices having inlet waveguides respectively connected to the waveguides of the horns of said exciters.

11. Device according to claim 10, wherein waveguides are respectively connected to the outputs of the directing devices, coaxial cables respectively interconnecting said waveguides and the local oscillator.

12. Device according to claim 11, wherein an attenuator is interposed in each coaxial cable.

13. Device according to claim 12, wherein the connection between each directing device and the corresponding intermediate-frequency amplifier comprises a coaxial cable branched on the coaxial cable ending to the local oscillator above the attenuator, and wherein each mixer consists of a detector-crystal mixer interposed in said branched coaxial cable.

14. A device for effecting angular measurements by means of microwaves, comprising a conventional microwave antenna having a focusing unit, two pairs of microwave exciters arranged in the vicinity of the unit focus, symmetrically with respect to two perpendicular planes passing through the axis of the focusing unit, respectively, a first mixer having a detector and directly connected to the two exciters of said pairs, two $-\pi/2$ phase shifters respectively connected to one of the exciters of each, two second mixers having a detector and respectively connected to said phase shifters and to the other exciters of said pairs, a single local oscillator connected to said three mixers for coupling them so that their output voltages are at an intermediate frequency, three intermediate frequency amplifiers respectively connected to said three mixers, and two phase discriminators respectively interconnecting the output of the amplifier connected to the first mixer and the outputs of the two amplifiers connected to said second mixers.

15. Device according to claim 14, wherein two voltmeters calibrated in angle readings are respectively connected to the outputs of the phase discriminators.

References Cited in the file of this patent

UNITED STATES PATENTS

| | | |
|---|---|---|
| 2,468,093 | Marchand | Apr. 26, 1949 |
| 2,512,611 | Casabona | June 27, 1950 |
| 2,608,683 | Blewett | Aug. 26, 1952 |